3,523,125
LIQUID PHASE OXIDATIVE DEHYDROGENATION OF ALDEHYDES AND KETONES
Robert J. Theissen, Westfield, N.J., assignor to Mobil Oil Corporation, a corporation of New York
No Drawing. Filed Apr. 16, 1968, Ser. No. 721,611
Int. Cl. C07c 167/14
U.S. Cl. 260—397.2     11 Claims

ABSTRACT OF THE DISCLOSURE

Aldehydes and cyclic and acyclic ketones are converted to the corresponding $\alpha$-$\beta$ unsaturated derivative by oxidative dehydrogenation. The reaction is carried out at 30–200° C. in the liquid phase and in the presence of a catalyst system comprising a complex or chelate of a metal of the Pt or Pd series and usually a quinone or an inorganic redox system co-catalyst. The unsaturated ketone products can be polymerized and copolymerized to thermoplastic polymers useful for making extruded or molded shapes. The unsaturated aldehydes can be converted to thermosetting polymers for making molded shapes (e.g., British 933,710). The unsaturated ketones of the steroids are produced, e.g., 4-cholesten-3-one which can be reduced to cholesterol by the enol-acetate and sodium borohydride reduction.

BACKGROUND OF THE INVENTION

Field of the invention

This invention relates to oxidative dehydrogenation. It is more particularly concerned with liquid phase catalytic oxidative dehydrogenation of aldehydes and cyclic and acyclic ketones to the corresponding $\alpha$-$\beta$ unsaturated derivatives.

Description of the prior art

Various methods have been proposed to prepare unsaturated etones, such as 2-cyclohexen-1-one. Many give low yield of product. Others involve reactants that are either relatively expensive or not readily available or both. For example, it has been proposed to oxidize cyclohexene to 2-cyclohexen-1-one (U.S. Pat. Nos. 2,992,272 and 2,369,182). Another procedure involves dehydrobromination of 2-bromo-cyclohexanone [J. Chem. Soc. 607 (1954)]. The procedure set forth in Organic Syntheses uses 3-ethoxy-2-cyclohexanone as the starting material [Org. Syn., 40, 14 (1960)]. A recent patent (U.S. 3,050,561) described a route using vinyl-cyclohexene. A Birch reduction of anisole gives 2-cyclohexen-1-one in about 20% yield in small scale reactions, [J. Chem. Soc., 430 (1934)]. Larger scale reactions, however, are very hazardous. It will be recognized that some of these methods are adaptable to other ketones and aldehydes. Insofar as is now known, it has not been proposed to prepare 2-cyclohexen-1-one or other usaturated ketones or aldehydes by selective dehydrogenation of the corresponding saturated ketone in the liquid phase.

SUMMARY OF THE INVENTION

This invention provides a process for producing an unsaturated ketone or aldehyde that comprises contacting a ketone reactant or aldehyde reactant and molecular oxygen-containing gas, in the liquid phase, with a catalyst system comprising a complex or chelate of a Pt or Pd series metal and generally an organic or an inorganic redox system co-catalyst.

DESCRIPTION OF SPECIFIC EMBODIMENTS

The aldehyde reactant used in the process of this invention is an aldehyde having at least one pair of alpha and beta carbon atoms with at least one hydrogen atom on each. It can be straight chain or branched chain and can contain from 3 carbon atoms to 14 or more carbon atoms. Non-limiting examples of the aldehyde reactants are propanal, butanal, 2-methylpentanal, pentanal, 2-methylbutanal-4, hexanal, octanal, 2-ethylhexanal, decanal, undecanal, dodecanal, tetradecanal, and octadecanal.

The ketone reactant used in the process of this invention is a ketone having at least one pair of alpha and beta carbon atoms with at least one hydrogen atom on each. It can be an open chain ketone or a cyclic ketone having 4 to 14 carbon atoms or more. Typical ketone reactants are butanone (methylethyl ketone); pentanone-2; pentanone-3; hexanone-2; 2-methylpentanone-3; heptanone-4; 2,4-dimethylpentanone-3; heptanone-3; 2-methylhexanone-5; octanone-3; 4-methylheptanone-5; octanone-2; nonanone-2; nonanone-5; decanone-2; decanone-4; undecanone-2; undecanone-3; tetradecanone-3; chloestanone-3; cyclopentanone; cyclohexanone; 3-methylcyclohexanone; cycloheptanone; and 2,5-dimethylcyclohexanone.

The catalyst used in the process of this invention is a chelate or a complex of a metal of the platinum and palladium series of metals (i.e., Atomic Nos. 44–46 and 76–78, inclusive), in which the valence of the metal is lower than the maximum. Typical chelating agents are acetylacetone and L-alanine.

The complex catalyst contemplated herein is a complex of a platinum or palladium series metal halide (Cl, Br, or I), in which the valence of the metal is lower than the maximum, with a ligand, i.e., a trihydrocarbyl phosphine, arisine, or stibine. The complexed catalyst can also contain carbonyl.

The preferred ligands in the catalyst complex are trihydrocarbyl phosphines, but trihydrocarbyl arisines and stibines can be used. Carbon monoxide is also a suitable ligand. "Hydrocarbyl," as used in the specification and claims, indicates any acyclic or cyclic (alicyclic or aromatic) radical. The three hydrocarbyl groups attached to phosphorous, arsenic, or antimony in the ligand can be the same or different groups. Typical ligands are carbon monoxide,
trimethylphosphine,
triethylphosphine,
tri-n-butylphosphine,
triamylphosphines,
trihexylphosphines,
tripropylphosphine,
trinonylphosphines,
tridecylphosphines,
di-n-butyl octadecylphosphine,
triethylhexylphosphine,
dimethylethylphosphine,
triphenylphosphine,
tris(dimethylphenyl)phosphine,
ethyl-bis(B-phenylethyl)phosphine,
tricyclopentylphosphine,
tricyclohexylphosphine,
dimethylcyclopentylphosphine,
dicyclohexylmethylphosphine,
phenyldiethylphosphine,
dicyclohexylphenylphosphine,
diphenylmethylphosphine,
diphenylbutylphosphine,
diphenylbenzylphosphine,
trilaurylphosphine, and arsines and stibines substituted as in the foregoing, i.e., trimethylarsine, trimethylstibine, triethylarsine, triethylstibine, etc.

Typical complex catalysts of the type contemplated herein are described in U.S. Pats. Nos. 3,239,566 and 3,239,571, to which reference is made. The preferred catalysts are chelates and complexes of Pd (II). Typical preferred catalysts are dichloro-bis (triphenylphosphine) palladium (II), dichloro-bis (pyridine) palladium (II), and palladium acetylacetonate. The mole ratio of reactant to catalyst can vary widely from 1:1 to 6000:1.

In order to re-oxidize the catalyst metal and to inhibit the precipitation of Pt or Pd series metal, a co-catalyst is usually used. As is demonstrated infra in Example 13, however, it is not essential. To co-catalyst used in the process of this invention can be any of the well-known organic or inorganic redox systems. Preferably, the organic redox system is a quinone, such as p-benzoquinone, tetrachloro-p-benzoquinone; diphenylquinone; 2,3-dichloro-5,6-dicyano-p-quinone; 1,4-naphthoquinone; and 2-ethylanthroquinone. In the present process, the quinone is reduced to a hydroquinone, which can be reoxidized to the quinone by known methods. The preferred inorganic redox system is a cupric salt or complex, such as cupric acetate, cupric sulfate, cupric nitrate, dichloro-bis (triphenylphosphine) copper (II), and cupric acetylacetonate. It is also within the contemplation of this invention to use a combination of two or more co-catalysts, such as p-benzoquinone and cupric acetylacetonate. The mole ratio of co-catalyst to catalyst can vary widely from 0 to 1000.

The molecular oxygen-containing gas can be substantially pure oxygen or it can be a mixture containing molecular oxygen, such as air and mixtures of oxygen and nitrogen, or of air and oxygen. Although the presence of oxygen is not absolutely essential in reactions using a quinone co-catalyst, it is usually advantageous for a faster and more efficient reaction. In the case of inorganic (cupric) co-catalysts, however, reactions are usually inhibited in the absence of molecular oxygen. Thus, cupric ions help to inhibit the precipitation of metallic palladium, but in doing so they are reduced to cuprous ions. Oxygen reconverts the cuprous to cupric ions.

The process can be carried out at atmospheric pressure or under pressures up to about 200 p.s.i.g. oxygen partial pressure. In general, the amount of oxygen used will be between about 3 and about 50 volumes per volume of reaction mixture/hour.

The temperature of this reaction of this invention can be between about 30° C. and about 200° C., and preferably between about 70° C. and about 115° C. The reaction time can vary widely between about 1 hour and about 30 hours.

The use of a solvent is not necessary in the process of this invention, as many reactions can be carried out using excess ketone or aldehyde reactant, i.e., neat reactant. The choice of solvents depends somewhat upon the catalyst and co-catalyst used and a single homogeneous solution is highly preferable but not essential. Examples of solvents employed in this process are organic acids, such as, acetic acid and benzoic acid, acetic acid-water combinations, dioxane, pyridine, nitrobenzene, benzonitrile, toluene, and petroleum ether. Runs using a quinone cocatalyst are more efficiently carried out in acetic or benzoic acid solvent. Using a cupric co-catalyst, acetic acid can be used, but neat reactant is highly advantageous and provides a mass action effect for reaction rates.

Catalyst promoters, such as sodium, lithium, and potassium acetates, sodium bicarbonate, and pyridine, in small amounts similar to the concentration of the catalyst, sometimes eliminate induction periods and may increase reaction rate and the level of conversion.

*Example 1.*—A stirred mixture of cupric acetate monohydrate (8.5 g., 0.0425 mole), dichlorobis (triphenylphosphine) palladium (II) (1.5 g., 0.0021 mole), and cyclohexanone (100 g., 1.02 moles) in acetic acid (50 g., 0.84 mole) was warmed to 77° C. while an oxygen bubble (20 cc./min.) was maintained below the surface. After a reaction time of 10.5 hours the reaction mixture (as analyzed by gas chromatography) showed an 8.3% total conversion of cyclohexanone to cyclohexenone (92%), phenol (4%) and unknown products (4%), a major amount of which was adipic acid.

*Example 2.*—A stirred mixture of dichlorobis (triphenylphosphine) copper (II) (10.0 g., 0.0151 mole) and dichlorobis (pyridine) palladium (II) (0.5 g., 0.00149 mole) in cyclohexanone (100 g., 1.02 moles) was quickly heated to 100° C. whereupon 15 cc. $O_2$/min. was bubbled into the solution. The total conversion after a period of 24 hours was 19.6% with a selectivity to cyclohexenone of 95%, the remainder being predominately phenol.

*Example 3.*—A stirred mixture of dichlorobis (triphenylphosphine) copper (II) (10.0 g., 0.0151 mole), dichlorobis (triphenylphosphine) palladium (II) (2.0 g., 0.00286 mole), and potassium acetate (0.1 g., 0.001 mole) in cyclohexanone (100 g., 1.02 moles) was warmed to 100° C. with 15 cc. $O_2$/min. bubbling into the solution. A mirror and gray-black haze formed slowly on the flask. At the end of the six-hour reaction time analysis showed a 17.6% conversion of cyclohexanone consisting of 94% cyclohexenone and 2% phenol. Vacuum distillation of the volatile organic materials, an analysis of which closely corresponded to that of the reaction mixture, gave 97.5 g. of distillate.

*Example 4.*—A stirred mixture of cupric acetylacetonate (5.5 g., 0.021 mole) and palladium acetylacetonate (0.05 g., 0.000164 mole) in cyclohexanone (98.0 g., 1.0 mole) and acetic acid (52.0 g., 0.87 mole) was heated to 105° C. with 150 cc. $O_2$/min. bubbling into the green-blue solution. A gray-black film slowly formed on the flask. Analysis after a reaction time of 24 hours showed a 36% conversion with a 39% selectivity to cyclohexenone.

*Example 5.*—A stirred solution of p-benzoquinone (20.0 g., 0.185 mole), palladium acetylacetonate (0.05 g., 0.000164 mole) and benzoic acid (50.0 g., 0.41 mole) in cyclohexanone (98.0 g., 1.0 mole) was heated quickly to 110° C. while 15 cc. $O_2$/min. bubbled into the solution. A two-hour reaction time showed a 17.2% conversion of cyclohexanone and the product contained 95% cyclohexenone and 3% phenol.

*Example 6.*—A stirred solution of p-benzoquinone (20.0 g., 0.185 mole) and palladium acetylacetonate (0.5 g., 0.00164 mole) in cyclohexanone (100 g., 1.02 moles) and acetic acid (52 g., 0.87 mole) was heated at 110° C. while 15 cc. $O_2$/min. bubbled into the solution. Analysis after 1 hour showed a 15.5% conversion of cyclohexanone to cyclohexenone (96%) and phenol (2%).

*Example 7.*—A stirred mixture of p-benzoquinone (20.0 g., 0.185 mole), palladium acetylacetonate (0.1 g., 0.00033 mole), cupric acetylacetonate (2.6 g., 0.01 mole) and benzoic acid (50.0 g., 0.41 mole) in cyclohexanone (98.0 g., 1.0 mole) was heated to 110° C. while 20 cc. $O_2$/min. was bubbled into the solution. After 3.5 hours the conversion was 18.6% of which 94% was cyclohexenone. After 23 hours reaction time the conversion had increased to 50% of which 73% was cyclohexenone.

*Example 8.*—Into a pressure bottle equipped with a release valve was placed p-benzoquinone (20.0 g., 0.185 mole), palladium acetylacetonate (0.5 g., 0.00164 mole) and benzoic acid (25.0 g., 0.205 mole) in propanal (58.0 g., 1.0 mole). The bottle was sealed and the stirred solution was heated to 110° C. at which point a palladium mirror formed rapidly. After 4 hours heating the conversion was 6.3% with an approximate 100% selectivity to propenal.

*Example 9.*—A stirred solution of p-benzoquinone (20.0 g., 0.185 mole), palladium acetylacetonate (0.5 g., 0.00164 mole) and benzoic acid (25.0 g., 0.205 mole) in butanal (72.0 g., 1.0 mole) was heated at 90° C. with 10 cc. $O_2$/min. bubbling into the solution. A 14.6% conversion after 5 hours was obtained. The products consisted of trans-2-butenal (79%) and the aldol condensation product from 2 moles of butanal (21%).

*Example 10.*—In a pressure bottle reaction identical to Example 8, but with the substrate being 3-pentanone (86.0 g., 1.0 mole) the conversion was 6.0% after 2.5 hours with selectivities to 1-penten-3-one, and 1,4-pentadien-3-one of 94 and 6%, respectively.

*Example 11.*—A stirred mixture of cupric acetylacetonate (5.5 g., 0.021 mole) and palladium acetylacetonate (0.5 g., 0.00164 mole) in acetic acid (52 g., 0.87 mole) and cyclopentanone (84.0 g., 1.0 mole) was heated at 105° C. for 25 hours while 25 cc. $O_2$/min. bubbled into the solution. The conversion was 21.8% with a 91% selectivity to cyclopentenone.

*Example 12.*—A stirred solution of palladium acetylacetonate (0.5 g., 0.00164 mole) and p-benzoquinone (2.9 g., 0.027 mole) in 3-methylcyclohexanone (3.0 g., 0.027 mole) and acetic acid (52 g., 0.87 mole) was heated at 110° C. while about 10 cc. $O_2$/min. was bubbled into the solution. After 12 hours, 36.2% of the starting material was converted to three products: 5-methyl-2-cyclohexen-1-one (58%), 2-methyl-2-cyclohexen-1-one (23%), and m-methylphenol (19%).

*Example 13.*—A stirred solution of cholestan-3-one (0.2 g., 0.00052 mole) and palladium acetylacetonate (0.16 g., 0.00052 mole) in acetic acid (8.0 g., 0.13 mole) was heated at 110° C. for 18 hours during which time 1-2 cc. $O_2$/min. was bubbled into the solution. The solution was filtered free of precipitated metallic palladium and the filtrate was diluted with water to give a brown solid (0.27 g.). Unused catalyst (0.12 g., 75% recovery) was recovered by dissolving the organic products in a minimum amount of hexane followed by filtration. The product was freed of a small amount of residual catalyst by chromatography on alumina with diethyl ether as eluent. Infrared and N.M.R. spectral analysis confirmed an 82% conversion. The product was primarily $\Delta^1$ cholesten-3-one containing minor amounts of $\Delta^{1,4}$ cholestadien-3-one and/or $\Delta^{4,6}$ cholestadien-3-one.

Although the present invention has been described with preferred embodiments, it is to be understood that modifications and variations may be resorted to, without departing from the spirit and scope of this invention, as those skilled in the art will readily understand.

What is claimed is:

1. A process for producing an $\alpha$-$\beta$ unsaturated aldehyde or ketone that comprises contacting an aldehyde reactant or a ketone reactant and molecular oxygen-containing gas, in the liquid phase, with a catalyst system comprising a chelate of a platinum or palladium series metal or a complex of a platinum or palladium series metal halide, in which the valence of the metal is lower than the maximum, with a trihydrocarbyl phosphine, arsine, or stibine.

2. A process for producing an $\alpha$-$\beta$ unsaturated aldehyde or ketone that comprises contacting an aldehyde reactant or a ketone reactant and molecular oxygen-containing gas, in the liquid phase, with a catalyst system comprising a chelate of a platinum or palladium series metal or a complex of a platinum or palladium series metal, in which the valence of the metal is lower than the maximum, with a trihydrocarbyl phosphine, arsine, or stibine and as co-catalyst an organic or inorganic redox system.

3. The process defined in claim 2, wherein said catalyst is dichlorobis (triphenylphosphine) palladium (II) and said co-catalyst is dichlorobis (triphenylphosphine) copper (II).

4. The process defined in claim 3, wherein said ketone reactant is cyclohexanone.

5. The process defined in claim 2, wherein said catalyst is palladium acetylacetonate and said co-catalyst is p-benzoquinone.

6. The process defined in claim 5, wherein said ketone reactant is cyclohexanone.

7. The process defined in claim 5, wherein said aldehyde reactant is butanal.

8. The process defined in claim 2, wherein said catalyst is palladium acetylacetonate and said co-catalyst is cupric acetylacetonate.

9. The process defined in claim 8, wherein said ketone reactant is cyclopentanone.

10. The process defined in claim 1, wherein said catalyst is palladium acetylacetonate.

11. The process defined in claim 10, wherein said ketone reactant is cholestan-3-one.

No references cited.

ELBERT L. ROBERTS, Primary Examiner

U.S. Cl. X.R.

260—586, 601